United States Patent [19]

Schoeps

[11] 4,243,129

[45] Jan. 6, 1981

[54] DEVICE FOR TIGHTENING A SCREW JOINT

[75] Inventor: Knut C. Schoeps, Tyresö, Sweden

[73] Assignee: Atlas Copco Aktiebolag, Nacka, Sweden

[21] Appl. No.: 886,651

[22] Filed: Mar. 15, 1978

[30] Foreign Application Priority Data

Mar. 22, 1977 [SE] Sweden ............................... 7703254

[51] Int. Cl.[3] ...................... F16D 43/21; F16D 13/08

[52] U.S. Cl. ................................ 192/56 C; 64/30 E; 192/150

[58] Field of Search .................. 192/0.034, 56 C, 150; 64/30 E

[56] References Cited

U.S. PATENT DOCUMENTS

| | | | |
|---|---|---|---|
| 1,561,506 | 11/1925 | Chilton | 64/30 E X |
| 1,561,537 | 11/1925 | Hayes | 192/56 C |
| 2,468,193 | 4/1949 | Goff | 192/56 C |
| 3,370,680 | 2/1968 | Bangerter et al. | 192/56 C |
| 3,618,730 | 11/1971 | Mould | 192/56 C |
| 3,955,662 | 5/1976 | Thakston | 64/30 E |
| 3,956,905 | 5/1976 | Thakston | 64/30 E |

*Primary Examiner*—Allan D. Herrmann

*Attorney, Agent, or Firm*—Frishauf, Holtz, Goodman & Woodward

[57] ABSTRACT

A device for tightening screw joints, comprising a motor, a torque responsive slip clutch and an output shaft, said slip clutch comprising a coil-type friction spring which by one of its ends positively engages one of the clutch halves and which, due to torsional pretensioning, engages the other clutch half by a radially acting friction grip. An adjustable auxiliary torsion spring is arranged in parallel with said friction spring in such a way as to increase or decrease the friction grip of the latter relative to said other clutch half and, thereby, increase or decrease the output torque level of the device. The device includes an adjusting mechanism for setting the torsion load of said auxiliary torsion spring.

7 Claims, 3 Drawing Figures

22 33 15 52 12 18 24 25 27 14 30 31 32 20 34 10 17 21 26 41 28 29

13 19 51 53 48 44 37 40 49 43 50 42 11 46

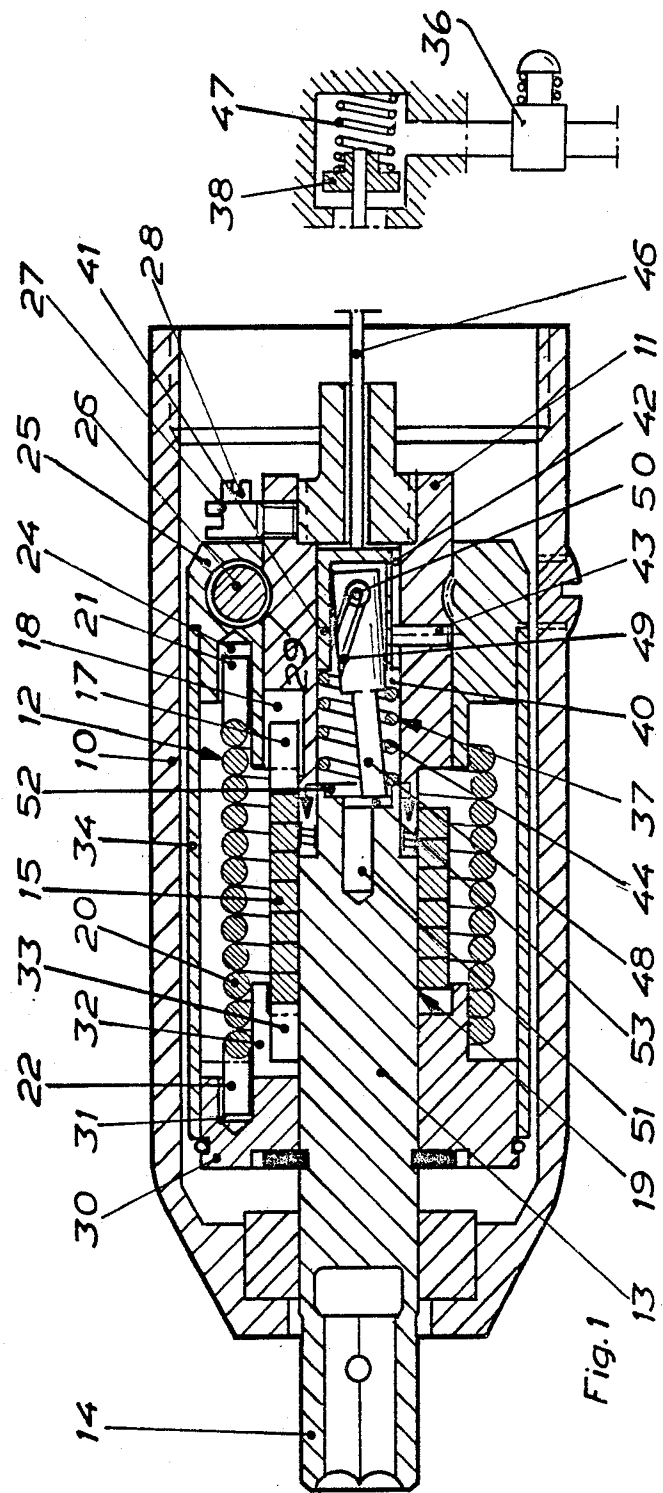
36
47
38
46
11
42
50
43
49
40
37
44
48
53
51
19
13
14
30
31
22
32
33
20
15
34
52
10
12
17
21
18
24
25
26
27
41
28
29
Fig.1
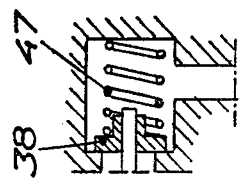
47
38
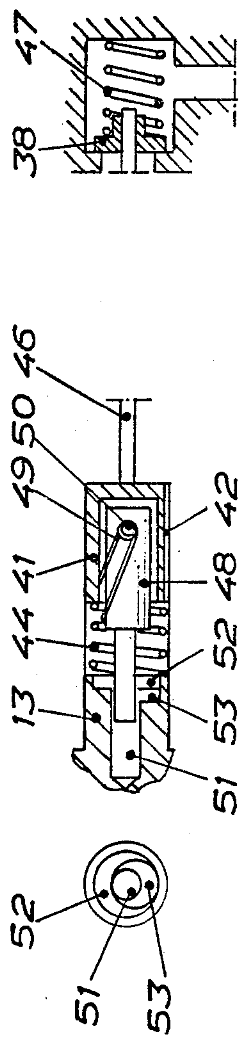
46
50
49
42
41
48
44
52
13
53
51
Fig.2
52
51
53
Fig.3

DEVICE FOR TIGHTENING A SCREW JOINT

This invention relates to a device for tightening screw joints. In particular, the invention is related to a screw joint tightening device comprising a friction spring slip clutch.

A problem concerned with devices of the above mentioned type is how to accomplish adjustability of the slip torque level.

The present invention intends to solve this problem, which is accomplished by the device defined in the claims.

BRIEF DESCRIPTION OF THE DRAWING

FIG. 1 shows a longitudinal section through the forward part of a pneumatic nut runner and, schematically, the pressure air shut off valve of the nut runner in open position, FIG. 2 shows, schematically, the air shut off valve in closed position, and FIG. 3 shows a cross section along line III—III in FIG. 1.

DETAILED DESCRIPTION

In FIG. 1, 10 designates the housing of the nut runner. The housing encloses a pneumatic motor (not shown) to which is connected a driving clutch half 11 of a torque responsive slip clutch 12. The slip clutch further comprises a driven clutch half 13 connected to an output shaft 14 and a coil type friction spring 15 which is arranged to transmit torque from the driving clutch half 11 to the driven clutch half 13.

For that purpose, the axially extending rear endpart 17 of the friction spring 15 is positively connected to the driving clutch half 11 via a recess 18 in the latter. The driven clutch half 13 has an external cylindrical friction surface 19 for cooperation with the internal surface of the friction spring 15. The latter transmits torque by means of its friction grip on the friction surface 19, which grip is accomplished by pre-tensioning of the spring 15. The characteristic feature of such a spring is that its friction grip is practically independent of the friction coefficient provided several windings of the spring is in engagement with the friction surface.

To make the friction spring 15 act as a slip clutch its rear end 17 has to be driven in the unwinding direction of the spring.

The nut runner comprises an auxiliary spring 20 which has rear and forward axially extending ends 21 and 22, respectively. The rear end 21 of the auxiliary spring 20 is received in a bore 24 in a setting ring 25 which is rotatively supported on the driving clutch half 11. The setting ring 25 is rotatable relative to the driving clutch half 11 by means of a screw which engages a thread 29 on the outer periphery of the driving clutch half 11, thereby constituting a worm gear. Stop screws 27 and 28 are provided to limit the rotation movement of the setting ring 25 relative to the driving clutch half 11.

The forward end 22 of the auxiliary spring 20 is positively connected to a coupling sleeve 30 via an axial bore 31 in the latter. The coupling sleeve 30 is journalled on the driven clutch half 13 so as to be able to rotate freely relative thereto. The coupling sleeve 30 further comprises a recess 32 in which is received the forward end 33 of the friction spring 15.

According to the above described arrangement, the auxiliary spring 20 is connected in parallel relationship to the friction spring 15 and acts between the ends 17 and 33 of the latter. This means that a torsion load is appliable on the friction spring 15 in order to increase or decrease the friction grip of the latter.

The auxiliary spring 20 can be arranged either to act in the winding direction of the friction spring 15, thereby increasing the pre-tensioning and the friction grip of the latter, or to act in the unwinding direction of the friction spring 15, thereby neutralizing to some extent the pre-tensioning and the friction grip of the latter. The direction of action as well as the pre-tensioning magnitude of the auxiliary spring 20 can be set by rotating the setting ring 25 by turning the screw 26.

The slip clutch 12 is covered by a protection tube 34 which is supported on the outer periphery of the setting ring 25 and the sleeve 30. As the slip torque level of this type of clutch is practically independent of the friction coefficient, the friction spring 15 may very well be lubricated with grease to avoid too much wear. The protection tube 34 prevents grease to be spread in the nut runner housing 10.

The nut runner shown in the drawing figures also comprises a pressure air supply valve 36 and an automatic shut off device. The shut off device comprises a release mechanism 37 and a shut off valve 38 operated by the release mechanism 37. The release mechanism comprises an axially extending bore 40 in the driving clutch half 11 in which is movably guided a cup 41. The latter is open toward the driven clutch half 13 and has an external, longitudinal groove 42 for cooperation with a key pin 43 secured in the driving clutch half 11, thereby preventing the cup 41 from rotating relative to the latter.

The cup 41 is biased rearwardly by a spring 44 acting between the forward end of the cup 41 and the rear end of the driven clutch half 13. A maneuver rod 46 connects the cup 41 with the shut off valve 38 which in turn is biased forwardly by a spring 47. Spring 47 is in the shown embodiment weaker than spring 44 but is supported by the air pressure to accomplish a closing force exceeding the load of spring 44.

The release mechanism 37 further comprises a release rod 48 the rear end of which is received in the cup 41, whereas the forward end thereof is arranged to cooperate with the rear end of the driven clutch half 13. The release rod 48 is pivotably mounted on a transverse pin 50 in the cup 41, and a spring 49 is also supported on the transverse pin 50 so as to act between the release rod 48 and the inner wall of the cup 41. The release pin 48 is thereby biased toward one side of the cup 41 and the bore 40.

The driven clutch half 13 is in its rear end provided with a concentric bore 51 the diameter of which is slightly larger than the diameter of the forward end of release rod 48. In its rear end the driven clutch half 13 is also provided with circular recesses 52 and 53 of which recess 52 is coaxial with bore 51 and the driven clutch half 13 while recess 53 is excentrically located. Recess 53 is of such a diameter and is so located as to constitute a circular tangent to recess 52 as well as to bore 51. See FIG. 3.

During tightening of a screw joint supply valve 36 as well as shut off valve 38 are open. The forward directed load upon the maneuver rod 46 from spring 47 and the motive air pressure exceeds backward directed force exerted by spring 44, which means that cup 41 and release rod 48 are urged forwardly. Due to the action of spring 49 the forward end of release rod 48 is brought into a lateral position in recess 52 and is prevented from moving forwards in that it abuts against the bottom of recess 52 or recess 53.

When reaching the slip torque level of the slip clutch 12 a relative rotation takes place between driving clutch half 11 and driven clutch half 13. Release rod 48 is then rotated relative to recesses 52 and 53 in that the cup 41 is locked as regards relative rotation to the driving clutch half 11. At first, the forward end of release pin 48 will follow the inner contour of the concentric recess 52, and, when reaching the tangent point between recess 52 and excentric recess 53 the release rod 48 is moved forwards to abut against the bottom of recess 53. Now, rod 48 will follow the inner contour of recess 53 until it reaches the tangent point between recess 53 and the bore 51. At this moment the forward end of release rod 48 falls down into bore 51, and the cup 41, the maneuver rod 46 and shut off valve 38 are displaced forwards. The shut off valve 38 is closed. This position is illustrated in FIG. 2.

The release mechanism is re-set in that the supply valve 36 is closed. The spring 47 then looses its support from the pressure air and is not able to withstand the load of spring 44 and maintain valve 38 in closed position. The cup 41, release rod 48, maneuver rod 46 and shut off valve 38 is then reclosed, and the release rod 48 is pivoted into a tilted position by means of spring 49.

The characteristic features of the release mechanism 37 as regards operation are specifically related to the characteristic of the above described slip clutch 12. The latter is characterized in that, after a completed tightening operation, including slippage at the desired maximum torque level, it stops in any position and does not tend to seek for any specific reengagement position defined by a certain angular relationship between the driving and driven clutch halves. This means that the release mechanism of the automatic shut off device has to work properly whichever the angular relationship between the clutch halves is. The release mechanism described above and shown in the figures releases within a relative rotation between the clutch halves of $1\frac{1}{2}$ revolution from the start of the overload slippage, no matter what the relative start position might be.

The embodiments of the invention are not limited to the shown and described example but can be freely varied within the scope of the invention as it is defined in the claims.

I claim:

1. A device for tightening screw joints, comprising:
a motor;
a torque responsive slip clutch coupled to said motor;
an output shaft coupled to said slip clutch;
said slip clutch including a driving clutch member, a driven clutch member, one of said clutch members having a friction surface, a coil-type friction spring having respective ends, said coil type friction spring being torsionally wound and pretensioned in itself relative to said friction surface and having one of its ends positively coupled to the other of said clutch members, said coil-type friction spring due to said torsional pretensioning engaging said friction surface by a radially acting friction grip, and an auxiliary torsion spring having its ends positively coupled to the ends of said coil-type friction spring and being arranged to apply a torque load in either direction on said coil-type friction spring to selectively boost or counteract the pretension of said coil-type friction spring; and
an adjusting means for continuously varying the relative angular positions between one of the ends of said coil-type friction spring and the corresponding end of said auxiliary torsion spring, for varying said torque load on said coil-type friction spring, thereby enabling said auxiliary torsion spring to selectively exert on said coil-type friction spring a friction grip boosting or reducing torsional load of the slip clutch.

2. Device according to claim 1, wherein said adjusting means comprises a setting ring which is rotatably supported on said one of said clutch members to which said friction spring is directly coupled, said adjusting means being connected to one end of said auxiliary torsion spring.

3. Device according to claim 2, wherein said adjusting means comprises a worm gear for rotating said setting ring relative to said one of said clutch members.

4. Device according to either of claims 2 or 3, wherein said one of said clutch members is the driving clutch member and is coupled to said output shaft.

5. Device according to claim 1 wherein said friction surface is provided on said driven clutch member.

6. Device according to claim 5 wherein said driven clutch member is an elongated member having a generally round outer periphery, said friction surface being provided on said outer periphery of said driven clutch member, said coil-type friction spring being wound over said outer periphery of said driven clutch member for frictionally engaging said outer periphery.

7. Device according to claim 1 wherein said auxiliary torsion spring is a coil-type spring wound around said coil-type friction spring.

* * * * *